United States Patent
Tian et al.

(10) Patent No.: US 9,178,429 B2
(45) Date of Patent: Nov. 3, 2015

(54) ACTUATION APPARATUS AND ACTUATION METHOD FOR AN ACTIVE SNUBBER CIRCUIT FOR A DC-DC CONVERTER

(71) Applicant: Robert Bosch GmbH, Stuttgart (DE)

(72) Inventors: Jian Tian, Buehl (DE); Stefan Koch, Kappelrodeck (DE); Ralf-Peter Bergmann, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 13/772,851

(22) Filed: Feb. 21, 2013

(65) Prior Publication Data

US 2013/0223104 A1 Aug. 29, 2013

(30) Foreign Application Priority Data

Feb. 24, 2012 (DE) .......................... 10 2012 202 869

(51) Int. Cl.
  *H02M 3/335* (2006.01)
  *H02M 1/34* (2007.01)
(52) U.S. Cl.
  CPC .......... *H02M 3/335* (2013.01); *H02M 3/33576* (2013.01); *H02M 2001/342* (2013.01); *Y02B 70/1491* (2013.01)
(58) Field of Classification Search
  CPC ............ H02M 3/335; H02M 3/33576; H02M 2001/342
  USPC ..................... 363/15–17, 21.01–21.18, 56.12
  See application file for complete search history.

(56) References Cited

U.S. PATENT DOCUMENTS

| | | | |
|---|---|---|---|
| 5,898,581 A | 4/1999 | Liu | |
| 6,771,521 B1 * | 8/2004 | Xiong et al. | 363/53 |
| 6,980,447 B1 * | 12/2005 | Schaible et al. | 363/56.05 |
| 8,787,044 B2 * | 7/2014 | Yang et al. | 363/24 |
| 2005/0117372 A1 * | 6/2005 | Caron | 363/56.12 |
| 2008/0043498 A1 * | 2/2008 | Mohandes | 363/22 |
| 2008/0170418 A1 * | 7/2008 | Nishiyama et al. | 363/17 |
| 2009/0154204 A1 * | 6/2009 | Taylor | 363/52 |
| 2011/0194313 A1 * | 8/2011 | Yoshinaga | 363/21.12 |
| 2012/0127762 A1 * | 5/2012 | Reddy | 363/21.04 |
| 2012/0257422 A1 * | 10/2012 | Lee et al. | 363/21.12 |
| 2014/0126247 A1 * | 5/2014 | Koch et al. | 363/21.14 |

* cited by examiner

*Primary Examiner* — Timothy J Dole
*Assistant Examiner* — Shahzeb K Ahmad
(74) *Attorney, Agent, or Firm* — Michael Best & Friedrich LLP

(57) ABSTRACT

A DC-DC converter including a transformer having a primary-side winding and a secondary-side winding with a center tap, and a storage choke. A rectifier circuit is connected to each of the taps at the ends of the secondary-side winding and generates a rectified output voltage at a second output of said DC-DC converter. A snubber circuit is switched via the rectifier circuit and stores energy occurring in said rectifier circuit. (An actuation apparatus includes a switching time determining device designed to determine a time interval as a function of the output voltage, the charge stored in the snubber circuit and the current fluctuations of the current through the storage choke occurring as a result of the rectification. A storage signal generator generates an actuation signal for discharging the snubber circuit as a function of the determined time interval.

10 Claims, 2 Drawing Sheets

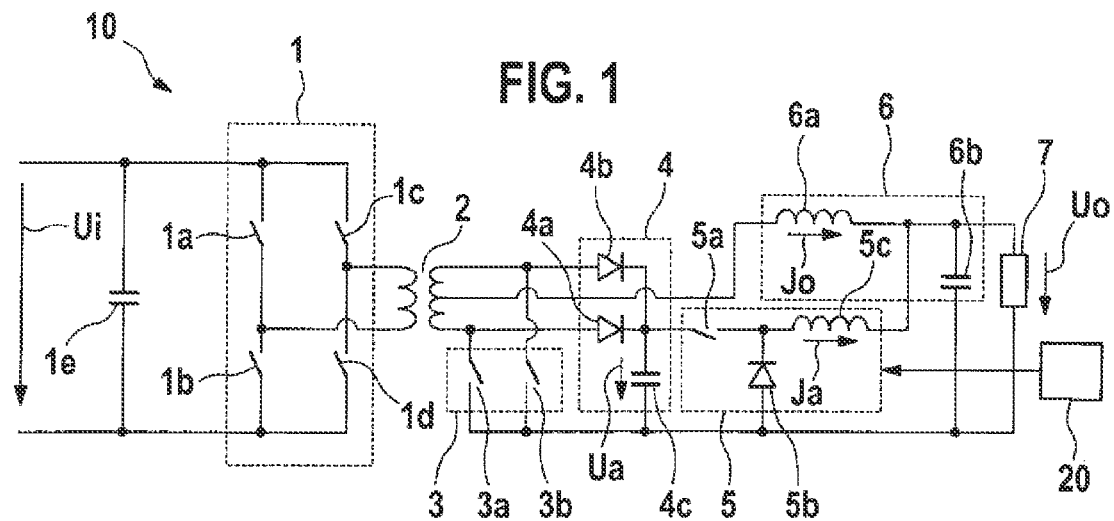
FIG. 1
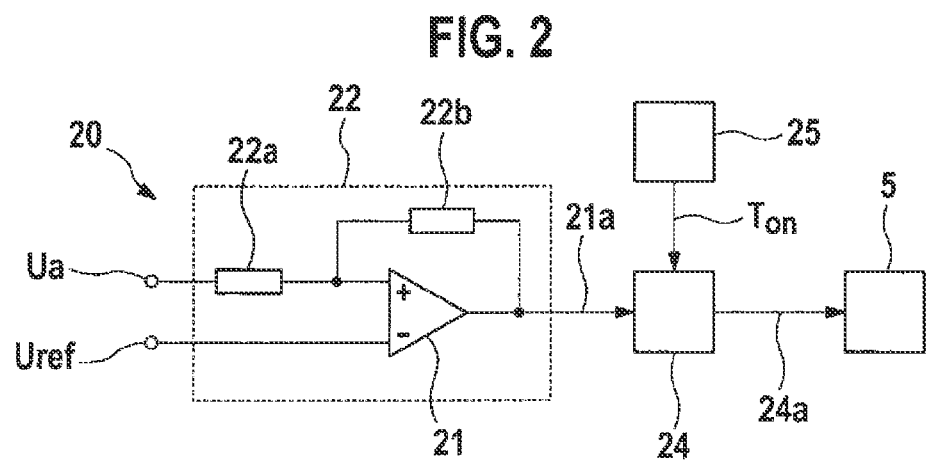
FIG. 2
FIG. 3

ACTUATION APPARATUS AND ACTUATION METHOD FOR AN ACTIVE SNUBBER CIRCUIT FOR A DC-DC CONVERTER

BACKGROUND OF THE INVENTION

The invention relates to an actuation apparatus and an actuation method for an active snubber circuit for a DC-DC converter, in particular for a push-pull rectifier employing synchronous rectification.

TECHNICAL FIELD

Synchronous rectifier circuits are typically used for DC-DC conversion, for example for supplying current to a low-voltage electrical system of a vehicle. The power semiconductor switches used for this purpose, for example MOSFETs, have a lower voltage dissipation than diodes especially at higher levels of direct current, whereby the efficiency of the rectifier can be increased. Due to the output capacity of blocked semiconductor switches, the phenomenon of "secondary ringings", i.e. the occurrence of undesired oscillations of the current or voltage, can occur with galvanically decoupled synchronous rectifiers. A resonance thereby occurs between the leakage inductance of the secondary side of the current transformer comprising the secondary-side inductor and the output capacity of the semiconductor switches.

For that reason, conventional synchronous rectifiers have attenuators, so-called "snubbers", which load a capacitor with the oscillation energy of the oscillations occurring when a critical voltage limit has been exceeded. Passive snubbers can, for example, consist of a series circuit having a capacitor and a resistor, which can be wired as an RC quenching circuit in parallel with the semiconductor switch. On the other hand, active snubbers have aside from the capacitor a further semiconductor switch, via which the excess charge can be discharged, for example back into the secondary side of the on-board electrical system, when a critical amount of charge on the capacitor has been exceeded.

The American patent publication U.S. Pat. No. 6,771,521 B1 discloses an active snubber for a synchronous rectifier, said snubber including a snubber capacitor which can be switchably discharged via a semiconductor switch.

The American patent publication U.S. Pat. No. 5,898,581 A discloses a push-pull rectifier circuit having an active snubber circuit, wherein an oscillating charge stored in a snubber capacitor can be fed back into the rectifier circuit via an inductive element.

SUMMARY OF THE INVENTION

According to one embodiment, the present invention provides a DC-DC converter comprising a transformer, which has a primary-side winding and a secondary-side winding with a center tap, a storage choke, which is coupled between the center tap and a first output of the DC-DC converter, a rectifier circuit, which is connected to taps on each end of the secondary-side winding and which is designed to generate a rectified output voltage at a second output of the DC-DC converter, a snubber circuit connected via the rectifier circuit, said snubber circuit being designed to store resonant oscillation energy arising in the rectifier circuit, and an actuation apparatus, which comprises: a switching time determining device, which is designed to determine a time interval as a function of the output voltage, the charge stored in the snubber circuit and the current fluctuations of the current through the storage choke occurring as a result of the rectification, and a control signal generator, which is designed to generate an actuation signal for discharging the snubber circuit as a function of the determined time interval.

According to a further aspect, the present invention provides a method for actuating a snubber circuit of an inventive DC-DC converter, which employs the following steps: determining a voltage which indicates the state of charge of the snubber circuit, comparing the determined voltage with a voltage threshold value, determining a time interval as a function of the output voltage of the DC-DC converter, the charge stored in the snubber circuit and the current fluctuations of the current through the storage choke occurring as a result of the rectification, and the generating of an actuation signal for discharging the snubber circuit as a function of the determined time interval.

Advantages of the Invention

It is a concept of the present invention to provide an actuation apparatus of a snubber circuit for a DC-DC converter, with which apparatus the period of time, in which a discharge of an energy temporarily stored in the snubber circuit back into the DC-DC converter occurs, is controlled such that the current generated by the discharge not only does not intensify the current fluctuations on the secondary side of the DC-DC converter but can even compensate said current fluctuations to a certain extent. The actuation apparatus therefore provides the advantage of minimizing voltage fluctuations in the output voltage of said DC-DC converter.

This results in the additional advantage that a capacitor of an output filter of the DC-DC converter has to have less capacity for smoothing the output voltage; thus enabling the manufacture of the DC-DC converter to be more cost effective.

The actuation apparatus can be particularly advantageous in a DC-DC converter that includes a snubber circuit comprising a charge collection device having two diodes, which are coupled in each case to the taps at the ends of the secondary-side winding of the transformer, and a snubber capacitor, which is coupled to the two diodes and which is designed to store the oscillation energy as a charge, and comprising a discharge circuit, which is designed to selectively discharge the charge stored in the snubber capacitor. By the use of an active snubber circuit, the point in time of the discharge of the discharge circuit can be precisely set.

The discharge circuit can advantageously be a buck converter, which comprises an inductor, which is designed to feed the charge stored in the snubber capacitor back into the first output of the DC-DC converter, and a discharge switch, which is coupled between the snubber capacitor and the inductor and which is designed to selectively connect said snubber capacitor to said inductor as a function of the actuation signal. By the use of inductive feedback, the currents through the storage choke and the inductor of the snubber circuit can be particularly well calibrated to one another; thus enabling the current fluctuations to be very effectively compensated.

The DC-DC converter can advantageously comprise a full bridge circuit, which is coupled to the primary-side winding of the transformer. In so doing, the DC-DC converter can be a push-pull converter, and the actuation signal can be activated for the duration of the determined time interval for discharging the snubber circuit and be deactivated at a point in time whereat the push-pull converter switches into the push-pull mode. By calibrating the discharge processes of the snubber circuit to the switching cycle of the primary side of the push-pull converter, a suppression of feedback disturbances into the primary side can be implemented in an advantageous manner.

According to one embodiment, the rectifier circuit can comprise a synchronous rectifier circuit.

Further features and advantages of embodiments of the invention ensue from the following description with reference to the accompanying drawings.

BRIEF DESCRIPTION OF THE DRAWINGS

In the drawings:

FIG. 1 shows a schematic depiction of a DC-DC converter comprising a snubber circuit according to one embodiment of the invention;

FIG. 2 shows a schematic depiction of an actuation apparatus of a snubber circuit for a DC-DC converter according to a further embodiment of the invention;

FIG. 3 shows a schematic depiction of an actuation method of a snubber circuit for a DC-DC converter according to a further embodiment of the invention;

DETAILED DESCRIPTION

Figure 4:
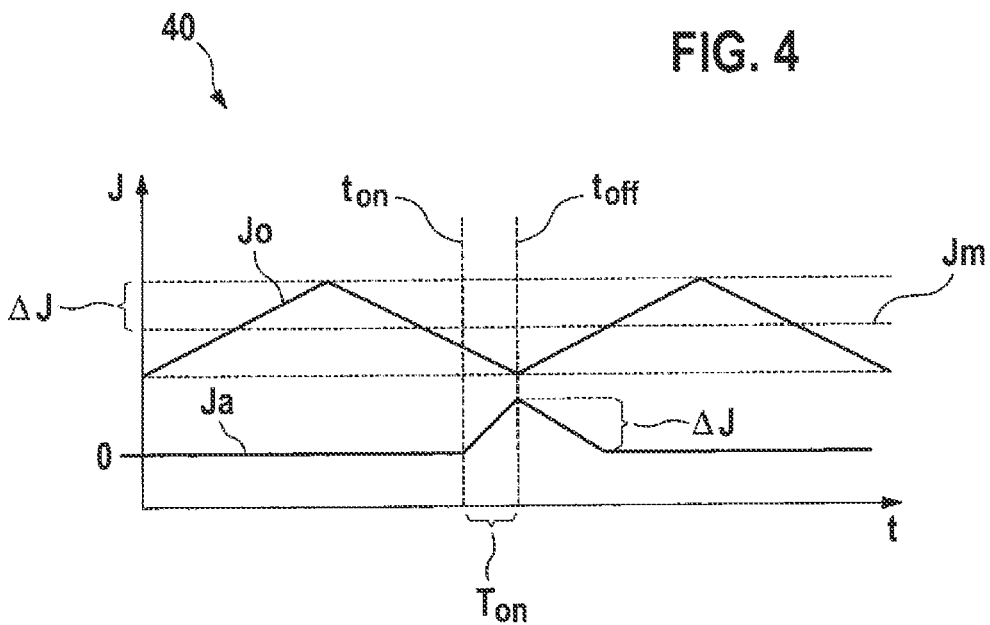
FIG. 4 shows a schematic depiction of a current-time diagram of the currents in a DC-DC converter according to a further embodiment of the invention.

FIG. 1 shows a schematic depiction of a DC-DC converter 10. The DC-DC converter 10 comprises a transformer 2 comprising a primary-side winding 2a and a secondary-side winding, which is divided into two sections via a center tap. The transformer 2 can, for example, be designed for converting a high voltage into a low voltage and have, for example, a turns ratio between primary-side and secondary-side winding that is above 1, in particular, for example, 10:1. The turns ratio of the two secondary-side winding sections can thereby be equal to one, i.e. the two secondary-side winding sections have the identical number of windings.

A full bridge circuit 1, which feeds the transformer 2 from a DC intermediate circuit capacitor 1e, can be arranged at the primary-side winding of the transformer 2. The full bridge circuit 1 can comprise switching devices 1a, 1b, 1c, 1d for this purpose, which are designed to alternately connect in each case the input terminals of the primary winding of the transformer 2 to terminals of the DC intermediate circuit capacitor 1e. The switching devices 1a, 1b, 1c, 1d can thereby each comprise semiconductor switches, such as, for example, field effect transistors (FETs). In one possible embodiment, the semiconductor switches are depicted in each case as self-closing nMOSFETs (n-type metal oxide semiconductor field-effect transistors, enhancement mode). It is, however, also possible for provision to made for other semiconductor switches in an appropriate form, for example in the form of IGBTs (insulated gate bipolar transistors), JFETs (junction field-effect transistors) or as pMOSFETs (p-type metal oxide semiconductor field-effect transistors).

The switching devices 1a, 1b, 1c, 1d of the full bridge circuit 1 can, for example, be actuated via a pulse-width modulation method comprising a duty cycle in order to control the ratio between input voltage Ui and output voltage Uo of the DC-DC converter.

The DC-DC converter shown in FIG. 1 can particularly be a push-pull converter, which is provided with a secondary-side push-pull rectifier circuit. The push-pull converter thereby comprises a primary-side full bridge circuit or, respectively, H-bridge circuit 1. It is, however, likewise possible to provide a half-bridge actuation or a parallel feed comprising a center tap of the primary winding of the transformer which is fed in a push-pull manner.

The secondary-side center tap of the transformer 2 can be coupled to a first output of the DC-DC converter 10 via a secondary-side storage choke 6a of an output filter 6. The first output can be connected to a first terminal of a secondary-side load 7. The two taps on the ends of the respective secondary-side winding sections can on the one hand be connected to two inputs of a synchronous rectifier circuit 3 and on the other hand to two inputs of an active snubber circuit. The DC-DC converter 1 thereby implements a push-pull rectifier circuit having active synchronous rectification. It is also thereby possible for the DC-DC converter to have a passive rectifier circuit. By way of example, reference is made below in each case to an active synchronous rectifier circuit, wherein the corresponding exemplary embodiment can likewise be transferred to passive rectifier circuits.

The synchronous rectifier circuit 3 is designed to tap a voltage applied to the transformer 2 on the secondary side from the taps at the ends of the respective secondary-side winding sections and convert said voltage into a direct current voltage at a second output of the DC-DC converter 10 via a suitable circuitry of synchronous rectifier switches 3a, 3b. The second output can be connected to a second terminal of the secondary-side load 7. In other words, the DC-DC converter 10 provides an output voltage Uo for the secondary-side load 7.

The active snubber circuit can comprise a charge collection device 4 and a discharge circuit 5 coupled to the charge collection device 4. Said charge collection device 4 can be connected via two inputs to the two taps at the ends of the respective secondary-side winding sections of the transformer 2 and comprise two diodes 4a and 4b, which collect the charge on a snubber capacitor 4c. The charge collection device 4 thereby acts as a voltage limiter for the secondary-side voltage of the transformer 2. Voltage peaks, which can arise at the inputs of the synchronous rectifier circuit 3, are thus intercepted and passed on to the snubber capacitor 4c. The secondary winding of the transformer 2 has a leakage inductance, whereby voltage oscillations, so-called "secondary ringing", can occur between the output capacitance of the elements of the synchronous rectifier circuit 3 and the leakage inductance. The resulting oscillation energy is conducted to the snubber capacitor 4c via the diodes 4a and 4b when a predetermined voltage has been exceeded. The snubber capacitor 4c can, for example, be implemented by means of a specified number of capacitors connected in parallel, such as, for example, ceramic capacitors connected in parallel.

The discharge circuit 5 can, for example, be a buck converter 5, which comprises a switching device 5a as discharge switch, a diode 5b and a storage choke 5c, via which the charge accumulated on the snubber capacitor 4c can be fed back into the secondary side of the DC-DC converter by active switching of the discharge switch 5a. If the snubber capacitor has received a predetermined charge quantity, i.e. if the voltage Ua applied to the snubber capacitor 4c has exceeded a predetermined voltage threshold value Uref, the energy stored on the snubber capacitor 4c can be fed back into the DC-DC converter in a controlled manner via the buck converter 5.

The discharge switch 5a used as well as the synchronous rectifier switch 3a, 3b of the synchronous rectifier circuit 3 can thereby respectively comprise semiconductor switches, such as, for example, field-effect transistors (FETs). In one embodiment, the semiconductor switches are comprised as self closing nMOSFETs (n-type metal oxide semiconductor field-effect transistors, enhancement mode). It is, however, also possible for provision to be made for other semiconductor switches in an appropriate form, for example in the form of IGBTs (insulated gate bipolar transistors), JFETs (junction field-effect transistors) or as pMOSFETs (p-type metal oxide semiconductor field-effect transistors).

The current fed into the load 7 consists of the current Jo flowing through the storage choke 6a and the current Ja from the buck converter 5 delivered via the inductor 5c. If the discharge switch 5a of the buck converter 5 is activated at unfavorable points in time, the current Ja delivered additionally via the inductor 5 can intensify the fluctuations in the current Jo through the storage choke, which occur in any case as a result of the pulsed operation of the synchronous rectifier switch 3. Such fluctuations in the output current can lead to current fluctuations and in so doing also to voltage fluctuations in the output voltage Uo at the load 7. The capacitor 6b of the output filter 6 can compensate these voltage fluctuations only to a limited extent.

FIG. 2 shows an actuation apparatus 20 of a snubber circuit for a DC-DC converter, in particular for the DC-DC converter 10 comprising the snubber circuit, which is shown in FIG. 1 and can include a charge collection device 4 and a buck converter 5. The actuation apparatus 20 can comprise a comparison device 22, in particular a comparator 22, a control signal generator 24 coupled to an output of the comparator 22 as well as a switching time determining device 25. The comparator 22 can include an operational amplifier 21, which receives the voltage signal Ua of the snubber capacitor 4c, which signal is coupled via an input resistor 22a, at a non-inverting input and receives the reference voltage signal bearing the voltage threshold value Uref at an inverting input. The output of the operational amplifier 21 can be fed back to the inverting input of the operational amplifier via a feedback resistor 22b.

Figure 5:
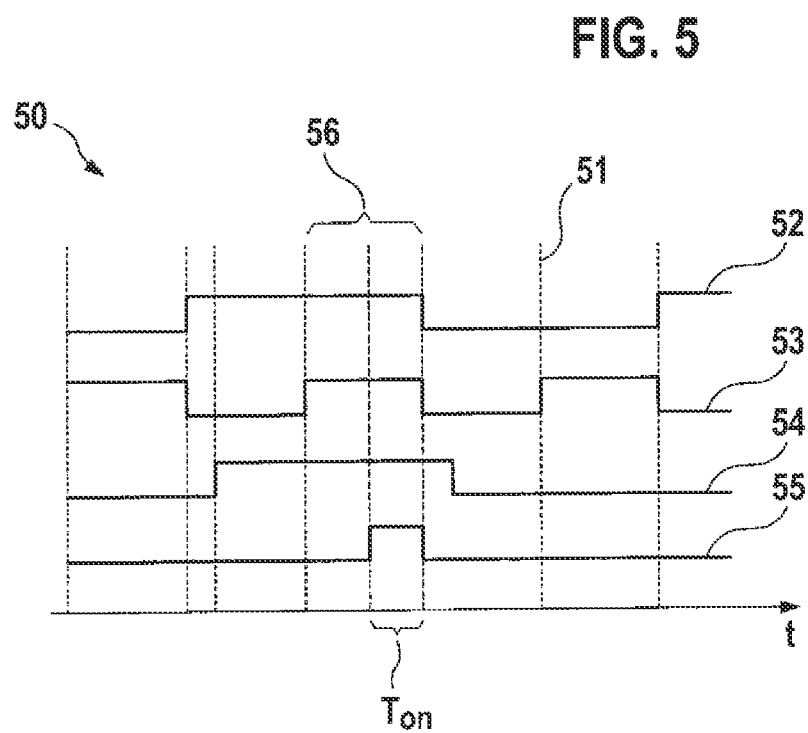
FIG. 5 shows a schematic depiction of a switching signal diagram for a DC-DC converter according to a further embodiment of the invention.

The function of the actuation apparatus 20 is explained below with reference to the diagrams depicted in FIGS. 4 and 5. In so doing, the curve progressions illustrated in FIGS. 4 and 5 are only of an exemplary nature and do not limit the principle mode of operation of the actuation apparatus 20. FIG. 4 shows a current versus time diagram 40 of the current profile of the currents Jo and Ja through the respective storage chokes or, respectively, inducers 6a and 5c. FIG. 5 shows a possible signal diagram 50 for signals in the actuation of the DC-DC converter, wherein a control clock pulse of the DC-DC converter 10 is depicted in each case as dashed lines 51 in the signal diagram 50.

The current Jo through the storage choke 6a fluctuates, as is illustrated in FIG. 4, in a continuous actuation operation (CCM, "continuous conduction mode") having a fluctuation width of ΔJ and a current average value Jm. The fluctuations thereby occur in time with the actuation cycle of the synchronous rectifier switch 3a, 3b of the synchronous rectifier circuit 3.

The voltage Ua at the snubber capacitor 4c is compared with the voltage threshold value Uref in the comparison device 22. If the voltage at the snubber capacitor 4c exceeds the voltage threshold value Uref, for example 10% of the voltage across the primary-side winding of the transformer 2, the comparison device emits an activation signal 21a, which indicates that the discharge switch 5a can or should be opened in order to discharge the charge stored on the snubber capacitor 4c via the inductor 5c into the first output of the DC-DC converter 10. An exemplary profile of the activation signal 21a is shown in diagram 50 as signal 54.

In this case, the control signal generator 24, which is designed to generate a control signal 24a for the snubber circuit and particularly for the discharge switch 5a of the buck converter 5c, can determine an optimal switch-on point in time $t_{on}$ for the control signal 24a. The control signal 24a for the discharge switch 5a is thereby shown by way of example as signal 55 in FIG. 5. At the point in time ton, the signal 55 switches into the active state and closes the discharge switch 5a. In so doing, the charge stored on the snubber capacitor 4c flows via the inductor 5c into the DC-DC converter 10.

As shown in FIG. 4, the time interval $T_{on}$, during which the discharge switch 5a is closed, i.e. the signal 55 is activated, should be selected such that the current Ja is then exactly fed into the load 7 if the current Jo flowing through the storage choke 6a is less than the mean value Jm. The current Ja can thereby partially cancel out the fluctuation ΔJ. The switch-off point in time $t_{off}$ of the discharge switch 5a can be selected in such a manner that it coincides with a switch-over point in time of the switching devices 1a, 1b, 1c, 1d of the primary-side full bridge circuit 1 of the DC-DC converter. By way of example in FIG. 5, the signal 52 is selected as the actuation signal for the switching device 1c. At the point in time, whereat the signal 52 is deactivated, the control signal 24a of the control signal generator 24 is also deactivated, as is depicted in the signal curve of the signal 55. The signal 53 furthermore reflects an exemplary actuation model for delimiting the time interval $T_{on}$. The actuation model can, for example, have double the frequency of a switching signal for one of the synchronous rectifier switches 3a, 3b.

The time interval $T_{on}$ can be selected such that the expected current Ja through the inductor 5c has a maximum value ΔJ, which is exactly as large as the amperage fluctuations ΔJ of the current Jo through the storage choke 6a. The time interval $T_{on}$ can accordingly be determined according to the formula $$T_{on}=0.5*(1-D)*T_S*(L_a/L_o)*(Uo/(Ua-Uo)),$$

wherein D is a duty cycle of the DC-DC converter 10, $T_S$ is the cycle length of the operation cycle of the DC-DC converter 10, $L_a$ is the value of the inductance of the storage choke 5c and $L_o$ is the value of the inductance of the storage choke 6a. The time interval $T_{on}$ is variable depending on output voltage and can be determined in the switching time determining device 25 and delivered to the control signal generator 24. The values of the time interval $T_{on}$ can, for example, be stored in a look-up table. The control signal generator 24 can then determine the optimal switch-on point in time $t_{on}$ for the discharge switch 5a from the time interval $T_{on}$ determined by the switching time determining device 25, the output signal 21a of the comparison device 22 as well as the switch-off point in time $t_{off}$, whereat said discharge switch 5a is to be closed again, and therefore generate an actuation signal 24a for the buck converter 5. The switch-on point in time $t_{on}$ can particularly lie in the time frame 56, in which the current Jo through the storage choke 6a lies below the mean value Jm.

FIG. 3 shows a schematic depiction of an actuation method 30 of a snubber circuit for a DC-DC converter, in particular of a discharge switch 5a of a discharge circuit 5 of an active snubber circuit as depicted in FIG. 1.

In a first step 31, a voltage Ua indicating the state of charge of the snubber circuit is determined. In a second step 32, the determined voltage Ua is compared with a voltage threshold value Uref. In a third step, a time interval $T_{on}$ is determined as a function of the output voltage Uo of the DC-DC converter, the charge stored in the snubber circuit and the current fluctuations of the current Jo through the storage choke 6a as a result of the synchronous rectification. In a fourth step 34, an actuation signal 24a is generated for discharging the snubber circuit as a function of the determined time inverval $T_{on}$.

What is claimed is:

1. A DC-DC converter, comprising:
    a transformer having a primary-side winding and a secondary-side winding with a center tap;
    a storage choke coupled between the center tap and a first output of the DC-DC converter;
    a rectifier circuit connected to each of the taps at the ends of the secondary-side winding and designed to generate a rectified output voltage at a second output of the DC-DC converter;
    a snubber circuit including a charge collection device that includes two diodes, each coupled to the taps at the ends of the secondary-side winding of the transformer, and a snubber capacitor coupled to the two diodes and designed to store resonant oscillation energy as charge occurring in the rectifier circuit, the snubber circuit switched via the rectifier circuit;
    a discharge circuit including a buck converter, the discharge circuit being coupled to and discharging the charge stored in the charge collection device to the first output, the buck converter including
        an inductor designed to feed the charge stored in the snubber capacitor back into the first output of the DC-DC converter, and
        a discharge switch coupled between the snubber capacitor and the inductor and designed to selectively connect said snubber capacitor to said inductor as a function of the actuation signal; and
    an actuation apparatus that actuates the discharge switch, the actuation apparatus including
        a switching time determining device to control the actuation apparatus, which is designed to determine a time interval as a function of the output voltage, the charge stored in the snubber circuit and the current fluctuations of the current through the storage choke occurring as a result of the rectification; and
        a control signal generator, which is designed to generate an actuation signal for discharging the snubber circuit as a function of the determined time interval.

2. The DC-DC converter according to claim 1, wherein the actuation apparatus further comprises:
    a comparison device, which is designed to compare a voltage applied to the snubber capacitor with a predetermined voltage threshold value and to emit an activation signal as a function of the comparison to the control signal generator; wherein said control signal generator is furthermore designed to generate the actuation signal as a function of the activation signal.

3. The DC-DC converter according to claim 1, further comprising:
    a full bridge circuit, which is coupled to the primary-side winding of the transformer.

4. The DC-DC converter according to claim 1, wherein the turns ratio of the primary-side winding with respect to the secondary-side winding of the transformer is greater than one.

5. The DC-DC converter according to claim 1, wherein the DC-DC converter is a push-pull converter and wherein the actuation signal is activated for the duration of the determined time interval for discharging the snubber circuit and is deactivated at a point in time whereat the push-pull converter switches into the push-pull mode.

6. The DC-DC converter according claim 1, wherein the rectifier circuit is a synchronous rectifier circuit.

7. A method for actuating a snubber circuit of a DC-DC converter according to claim 1, comprising the steps:
    determining a voltage which indicates the state of charge of the snubber circuit;
    comparing the determined voltage with a voltage threshold value;
    determining a time interval as a function of the output voltage of the DC-DC converter, the charge stored in the snubber circuit and the current fluctuations of the current through the storage choke occurring as a result of the rectification; and
    generating an actuation signal for discharging the snubber circuit as a function of the determined time interval.

8. The DC-DC converter according to claim 1, wherein the snubber circuit prevents current from returning to the primary-side winding.

9. The DC-DC converter according to claim 1, wherein the discharge circuit only permits discharge of the snubber circuit to the first output.

10. A DC-DC converter comprising:
    a first output and a second output;
    a transformer having a primary-side winding and a secondary-side winding with a center tap and end taps;
    a storage choke coupled between the center tap and the first output;
    a rectifier circuit connected to each of the end taps of the secondary-side winding and designed to generate a rectified output voltage at the second output;
    a snubber circuit switched via the rectifier circuit and designed to store resonant oscillation energy occurring in the rectifier circuit; and
    an actuation apparatus including
        a switching time determining device designed to determine a time interval as a function of the rectified output voltage, the charge stored in the snubber circuit and the current fluctuations of the current through the storage choke occurring as a result of the rectification; and
        a control signal generator designed to generate an actuation signal for discharging the snubber circuit as a function of the determined time interval,
    wherein the snubber circuit includes a charge collection device designed to store the resonant oscillation energy occurring in the rectifier circuit as charge, and a discharge circuit, which is designed to selectively discharge the charge stored in the charge collection device,
    wherein the charge collection device includes
        two diodes, each coupled to the taps at the ends of the secondary-side winding of the transformer; and
        a snubber capacitor coupled to the two diodes and designed to store the oscillation energy as charge, and
    wherein the discharge circuit is a buck converter, which includes
        an inductor designed to feed the charge stored in the snubber capacitor back into the first output of the DC-DC converter; and
        a discharge switch coupled between the snubber capacitor and the inductor and designed to selectively connect said snubber capacitor to said inductor as a function of the actuation signal.

* * * * *